United States Patent
Desroziers et al.

(10) Patent No.: US 12,455,271 B2
(45) Date of Patent: Oct. 28, 2025

(54) METHOD OF DETECTING AT LEAST ONE GEOLOGICAL CONSTITUENT OF A ROCK SAMPLE

(71) Applicant: IFP Energies nouvelles, Rueil-Malmaison (FR)

(72) Inventors: Sylvain Desroziers, Rueil-Malmaison (FR); Mathieu Feraille, Rueil-Malmaison (FR); Vincent Clochard, Rueil-Malmaison (FR); Antoine Bouziat, Rueil-Malmaison (FR); Youri Hamon, Rueil-Malmaison (FR); Maxime Moreaud, Rueil-Malmaison (FR)

(73) Assignee: IFP Energies nouvelles, Rueil-Malmaison (FR)

(*) Notice: Subject to any disclaimer, the term of this patent is extended or adjusted under 35 U.S.C. 154(b) by 392 days.

(21) Appl. No.: 17/919,319

(22) PCT Filed: Mar. 31, 2021

(86) PCT No.: PCT/EP2021/058411
§ 371 (c)(1),
(2) Date: Oct. 17, 2022

(87) PCT Pub. No.: WO2021/219317
PCT Pub. Date: Nov. 4, 2021

(65) Prior Publication Data
US 2023/0154208 A1 May 18, 2023

(30) Foreign Application Priority Data

Apr. 27, 2020 (FR) .................................. 2004169

(51) Int. Cl.
*G01N 33/24* (2006.01)
*G06T 7/11* (2017.01)
(Continued)

(52) U.S. Cl.
CPC ............ *G01N 33/24* (2013.01); *G06T 7/11* (2017.01); *G06T 7/90* (2017.01); *G06V 10/255* (2022.01);
(Continued)

(58) Field of Classification Search
CPC ........ G01N 33/24; G01N 3/045; G01N 20/10; G06T 7/11; G06T 7/90;
(Continued)

(56) References Cited

U.S. PATENT DOCUMENTS

2021/0264130 A1* 8/2021 Almers ................ G06V 10/806

FOREIGN PATENT DOCUMENTS

CN 209102420 U * 7/2019
WO 2015132531 9/2015

OTHER PUBLICATIONS

Su, Cheng et al. "Rock classification in petrographic thin section images based on concatenated convolutional neural networks." Earth Science Informatics 13 (2020): 1477-1484 (Year: 2020).*
(Continued)

*Primary Examiner* — Stephen R Koziol
*Assistant Examiner* — Michael Kim Maiden
(74) *Attorney, Agent, or Firm* — Fitch, Even, Tabin & Flannery LLP

(57) ABSTRACT

The present invention relates to a method of detecting a geological constituent (cge) of a rock sample, by use of a machine learning method (ALG) trained with a limited number of training images (IAP), through segmentation (SEG) and partitioning (DEC) of training images (IAP) into multiple patches.

16 Claims, 2 Drawing Sheets

(51) Int. Cl.
| | |
|---|---|
| *G06T 7/90* | (2017.01) |
| *G06V 10/20* | (2022.01) |
| *G06V 10/26* | (2022.01) |
| *G06V 10/774* | (2022.01) |
| *G06V 10/82* | (2022.01) |
| *G06V 20/60* | (2022.01) |

(52) U.S. Cl.
CPC ............ *G06V 10/26* (2022.01); *G06V 10/774* (2022.01); *G06V 10/82* (2022.01); *G06V 20/60* (2022.01); *G06T 2207/10024* (2013.01); *G06T 2207/20021* (2013.01); *G06T 2207/20081* (2013.01); *G06T 2207/20084* (2013.01); *G06T 2207/30181* (2013.01); *G06T 2207/30242* (2013.01)

(58) Field of Classification Search
CPC . G06T 2207/10024; G06T 2207/20021; G06T 2207/20081; G06T 2207/20084; G06T 2207/30181; G06V 10/255; G06V 10/26; G06V 10/774; G06V 10/82; G06V 20/20
See application file for complete search history.

(56) References Cited

OTHER PUBLICATIONS

Su, C., Xu, S., Zhu, K., & Zhang, X. (2020). Rock classification in petrographic thin section images based on concatenated convolutional neural networks. Earth Science Informatics, 13(4), 1477-1484. https://doi.org/10.1007/s12145-020-00505-1 (Year: 2020).*

Beaufort, L. & Dollfus, D. (2004), Automatic Recognition of Coccoliths by Dynamical Neural Networks. Marine Micropaleontology, 51(1-2), 57-73.

Manuel de micropaléontologie, published in 2011 by Mathieu, Bellier and Granier (ISBN 978-2-916733-04-3).

Thompson, S., Fueten, F. & Bockus, D. [2001] Mineral Identification Using Artificial Neural Networks and the Rotating Polarizer Stage. Computers & Geosciences, 27(9), 1081-1089.

Cheng Su et al: "Rock Classification in Petrographic Thin Section Images Based on Concatenated Convolutional Neural Networks", Arxiv.Org, Cornell University Library, 201 Olin Library Cornell University Ithaca, NY 14853, Mar. 23, 2020.

Wei Ren et al: "Identifying Rock Thin Section Based on Convolutional Neural Networks", Proceedings of 2019 The 9th International Workshop on Computer Science and Engineering, Sep. 2, 2019 (Sep. 2, 2019), pp. 345-351.

Pi Res De Lima Rafael et al: "Deep convolutional neural networks as a geological image classification tool", The Sedimentary Record, vol. 17, No. 2, Jun. 30, 2019 (Jun. 30, 2019), pp. 4-9.

Bourel Benjamin et al: "Automated recognition by multiple convolutional neural networks of modern, fossil, intact and damaged pollen grains", Computers & Geosciences, Pergamon, Amsterdam, NL, vol. 140, Apr. 14, 2020.

Flanders Marine Institute generated on Oct. 17; http://www.marinespecies.org/foraminifera/index.php; The World Foraminifera Database;.

International Search Report for PCT/EP2021/058411, mailed Jul. 16, 2021; 4 pages.

* cited by examiner

[Fig 1]
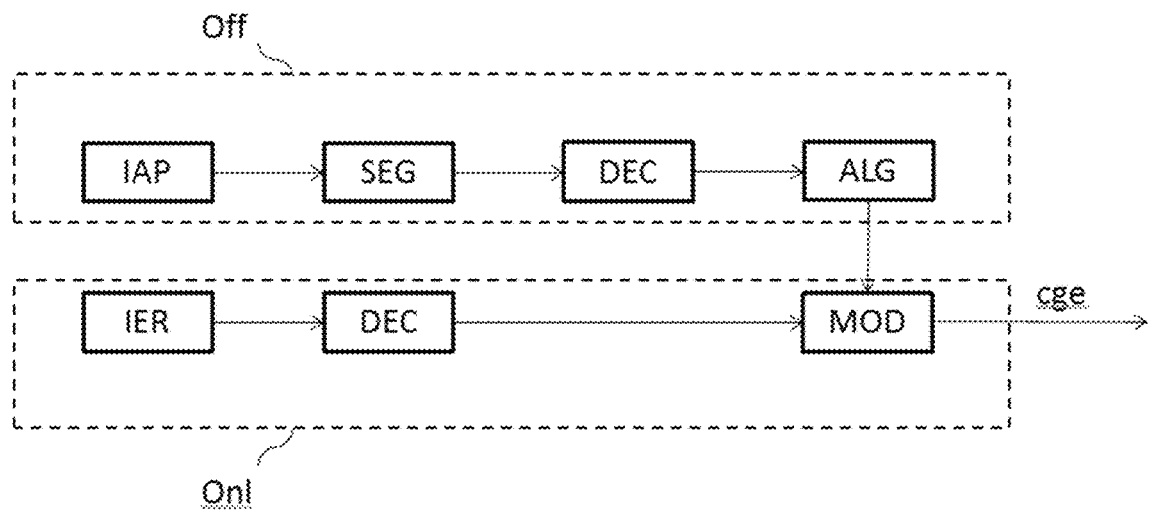
[Fig 2]
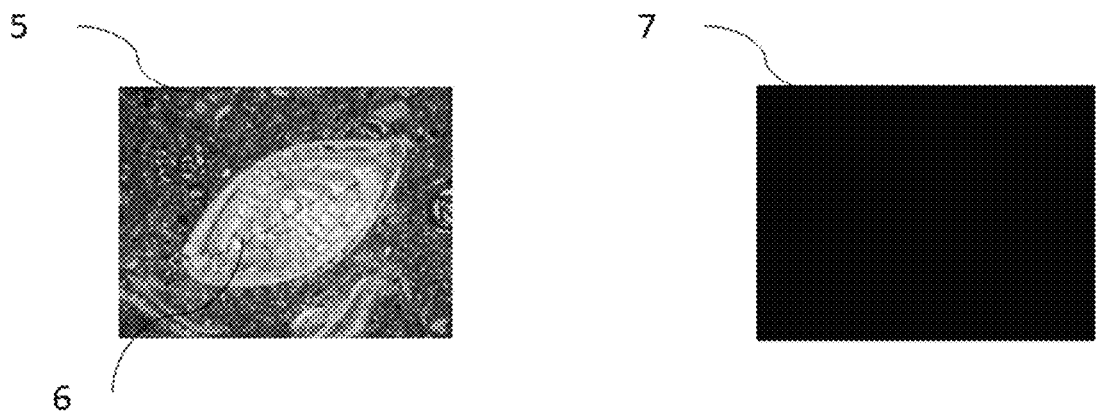
[Fig 3]
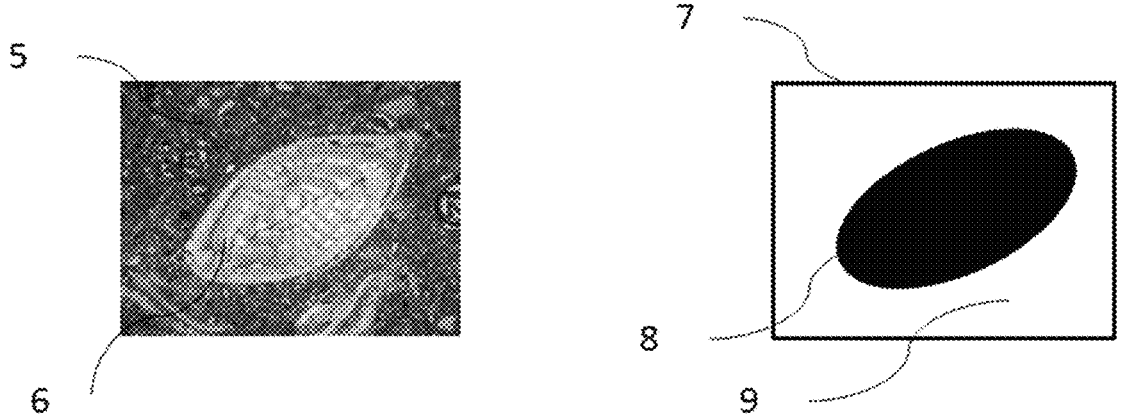

[Fig 4]
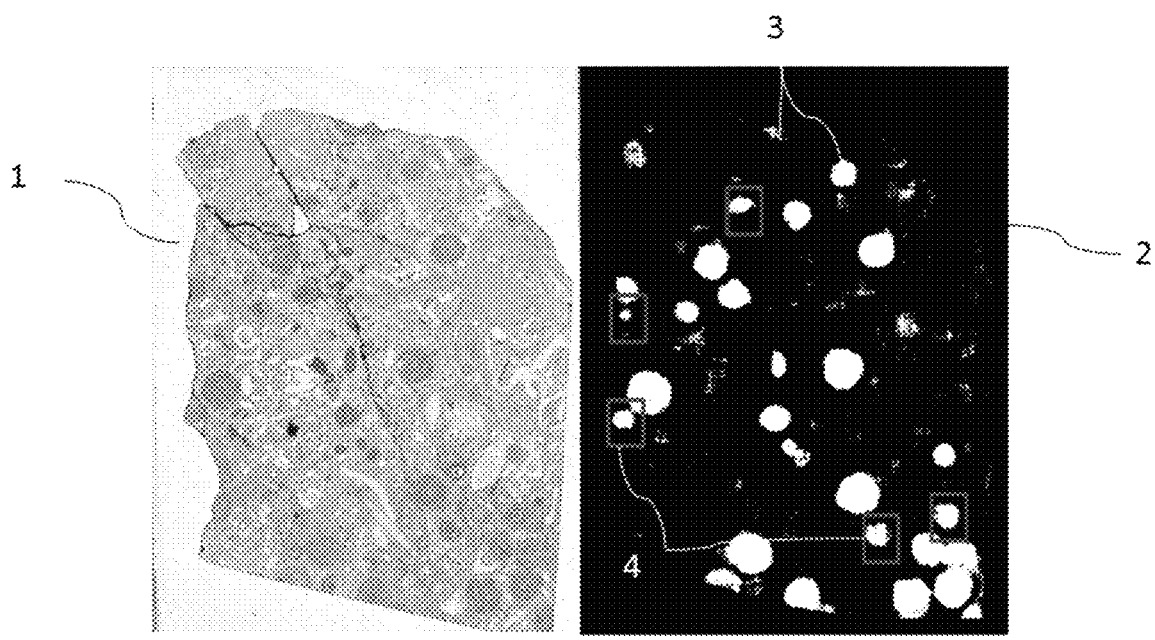

METHOD OF DETECTING AT LEAST ONE GEOLOGICAL CONSTITUENT OF A ROCK SAMPLE

CROSS-REFERENCE TO RELATED APPLICATIONS

Reference is made to International Application No. PCT/EP2021/058411, filed Mar. 31, 2021, which claims priority to French Patent Application No. 20/04.169, filed Apr. 27, 2020, the contents of which are incorporated herein by reference in their entirety.

BACKGROUND OF THE INVENTION

Field of the Invention

The present invention relates to the field of detection of geological constituents of a rock sample.

Description of the Prior Art

Characterization of a rock sample often requires identifying and counting specific constituents present in the sample, such as, for example, microfossils, nanofossils, plant debris, minerals, pollen spores, or similar items. For specialists, this can notably be done by observing the rock sample directly with the naked eye, or by cutting a thin slice, referred to as thin section, and studying it with the light microscope. This allows categorizing the rock more precisely and estimating the physical properties thereof, for civil engineering applications, site remediation, search for underground mineral or energy resources, etc.

Furthermore, when these geological constituents are microfossils (micropaleontology) or plant fragments (palynology) in sedimentary rocks, this type of analysis makes possible estimation of both the age, the environment (marine, coastal, continental, . . . ) and the climatic context at the time of sediment deposition. Applied to several samples of the same sedimentary succession, it becomes a way of reconstructing the evolution of climate in a geographical area through geologic ages (paleoclimatology).

BACKGROUND OF THE INVENTION

Detecting and counting some geological constituents is traditionally done manually by a human expert, which requires suitable training and can often be very tedious.

As for microfossils, the work entitled Manuel de micropaléontologie, published in 2011 by Mathieu, Bellier and Granier (ISBN 978-2-916733-04-3), can notably be consulted, as well as the foraminifera database on the website http://www.marinespecies.org/foraminifera/index.php. Such a database comprises a very large data volume. This database can therefore only be used by an expert, and not in an automated process.

As for minerals, a comparable document is the petrography atlas written in 2001 by McKenzie and Guilford, and published by Dunod (ISBN 978-2-100054-59-6).

As for pollen, the work entitled Paleopalynology, published by Alfred Traverse in 2007 (ISBN 978-1-4020-5610-9), can be consulted.

In order to make these analyses more accessible and faster, detection and counting automation using digital methods has been considered. This can be achieved by expert systems, more or less advanced thresholding techniques, various image analysis and processing methods, and especially machine learning methods, notably based on artificial neural networks.

As for microfossils, the following document can notably be consulted: Beaufort, L. & Dollfus, D. (2004), Automatic Recognition of Coccoliths by Dynamical Neural Networks. Marine Micropaleontology, 51(1-2), 57-73. This method is also described in patent application WO/2015-132,531 A1. However, such a method requires a large number of training images for the machine learning method. The patent application notably mentions the use of 10,000 images obtained by microscopy, and 100 images per morphological group. This large number of training images requires a very long preparation time and a significant number of preparatory operations with thin sections being prepared (notably by rock cutting, impregnation and lapping) and observations being made with the microscope for each thin section. The considered constituents must then be manually identified for each image, which requires work for an expert.

Regarding a machine learning method applied to minerals, the following document can be consulted: Thompson, S., Fueten, F. & Bockus, D. [2001] Mineral Identification Using Artificial Neural Networks and the Rotating Polarizer Stage. Computers & Geosciences, 27(9), 1081-1089. Similarly, this method requires a large number of training images (at least several hundred, or even several thousand), which involves the same drawbacks as those mentioned above.

SUMMARY OF THE INVENTION

The present invention detects geological constituents of a rock sample, automatically, with limited preparation time and a limited number of operations. The present invention therefore relates to a method of detecting at least one geological constituent of a rock sample, by use of a machine learning method trained with a limited number of training images, through segmentation and partitioning of the training images into multiple patches.

The present invention relates to a method of detecting at least one geological constituent of a rock sample from training images. For this method, the following steps are carried out:
  a) segmenting the training images into at least two colors: a first color for each area of the training images having no geological constituent, and at least a second color for each area of the training images comprising a geological constituent;
  b) partitioning the training images and the segmented images into multiple patches;
  c) training a machine learning classification algorithm by means of the patches of the training images and by use of the patches of the segmented training images to classify the patches of the training images according to the color of the patches of the corresponding segmented training images;
  d) acquiring an image of the rock sample;
  e) partitioning the acquired image of the rock sample into multiple patches; and
  f) detecting the at least one geological constituent in each of the patches of the acquired image of the rock sample by applying a model formed by the machine learning algorithm to the patches of the acquired image of the rock sample.

Advantageously, the geological constituent is selected from among microfossils, nanofossils, plant debris, minerals, pollen spores.

According to an embodiment, each one of the at least second colors corresponds to a type of geological constituent.

According to an aspect, the number of training images ranges between 3 and 20 and preferably between 3 and 10.

According to an implementation, the machine learning algorithm uses an artificial neural network, preferably a convolutional neural network or a fully convolutional neural network.

Advantageously, the image of the rock sample is acquired from a thin section of the rock sample.

According to a characteristic, the image of the rock sample is acquired by means of an optical or electron microscope, using polarized light or not, photography, synchrotron radiation tomography scan or X-ray imaging.

According to an embodiment, the machine learning algorithm is trained to classify the patches of the training images, by analysing the color of the central pixel of the patches of the segmented images.

Advantageously, the acquired image is partitioned into patches by carrying out, for each pixel of the acquired image, partitioning of a patch surrounding the pixel, and the model formed by the trained machine learning algorithm is used to determine whether the pixel belongs to the geological constituent.

According to an implementation, the machine learning algorithm is trained to segment the entire surface of the patches of the training images to delimit the geological constituents.

Advantageously, the geological constituents are detected by delimiting for each patch of the acquired image the geological constituents.

According to an implementation, the detection method comprises at least one additional step selected from among:

counting a number of geological constituents of the acquired image of the rock sample from the detection of the geological constituent, or determining a proportion of the rock sample volume occupied by the geological constituents, from detection of the geological constituent, or estimating at least one of morphological and textural characteristics of the geological constituents, or applying a supervised classification method to categorize the geological constituents from the detection of the geological constituent.

Furthermore, the invention relates to a soil or subsoil exploitation method wherein the following steps are carried out:
a) detecting at least one geological constituent of a rock sample by use of the detection method according to one of the above features; and
b) exploiting the soil or the subsoil according to the detection of the geological constituent of the at least one rock.

According to an embodiment, the soil or subsoil exploitation concerns the construction of a structure on the soil or in the subsoil, the storage of gas in the subsoil or the exploitation of raw materials of the soil or the subsoil, preferably the raw materials being the rock itself, or a material or a fluid contained in the soil or the subsoil.

The invention further relates to a method of determining the climate in geographical areas through geologic ages, steps are carried out:
a) taking at least two rock samples at different depths of an underground formation,
b) detecting at least one geological constituent for each rock sample by use of the detection method according to one of the above features; and
c) determining the climate and the geologic age in the geographical area according to the at least one detected geological constituent.

BRIEF DESCRIPTION OF THE DRAWINGS

Other features and advantages of the method according to the invention will be clear from reading the description hereafter of embodiments given by way of non-limitative example, with reference to the accompanying figures wherein:

FIG. 1 illustrates the steps of the detection method according to an embodiment of the invention;

FIG. 2 illustrates a first variant of the machine learning method used by the detection method according to the invention;

FIG. 3 illustrates a second variant of the machine learning method used by the detection method according to the invention; and FIG. 4 illustrates an acquired image of a rock sample and the areas where geological constituents have been detected using the method according to an embodiment of the invention.

DETAILED DESCRIPTION OF THE INVENTION

The present invention relates to a method of detecting geological constituents of a rock sample. A rock sample is understood to be a rock sample obtained by core drilling for example (notlimiting of the invention). Geological constituents are understood to be at least one constituent contained within the rock. Such a geological constituent of rocks can be selected from among microfossils, nanofossils, plant debris, minerals, pollen spores, or similar. Detection of geological constituents is understood to be the identification of geological constituents within the rock sample.

The detection method according to the invention is based on the use of an image of the rock sample and on the implementation of a machine learning algorithm for automating this detection.

According to an embodiment of the invention, the acquired image of the rock sample and all the training images used for training the machine learning algorithm can be of any type.

According to an implementation of the invention, the image can be that of an entire rock sample. Alternatively, the image can be that of a thin section of the rock sample. The samples observed can notably be slices referred to as thin sections of three types: very thin sections of materials of the order of 30 µm, thicker sections of the order of 100 µm, or polished sections whose thickness can be up to 10 mm. To be able to correctly observe these various types of sample under the microscope, it is important to have a flat surface with very low roughness (almost smooth).

Furthermore, the image can be obtained in different manners, for example by a microscope, using light polarized or not, a scan, a photograph, or any similar system.

According to a preferred embodiment of the invention, the image can be obtained by a microscope from a thin section of the rock sample.

According to the invention, the detection method comprises the following steps:
1—Training of the machine learning algorithm 2—Acquisition of the rock sample image
3—Detecting the geological constituents of the rock sample.

In a more detailed manner, the method according to the invention comprises the following steps:
1—Training of the machine learning algorithm
   1.1—Segmenting the training images
   1.2—Partitioning the training images and the segmented images
   1.3—Classification
2—Acquisition of the rock sample image
3—Detecting the geological constituents of the rock sample
   3.1—Partitioning the acquired image
   3.2—Detecting the geological constituents.

Step 1 and the associated sub-steps 1.1 to 1.3 can be carried out offline, once and beforehand. Steps 2 and 3, and the associated sub-steps 3.1 and 3.2, can be carried out online, for each rock sample considered. In other words, if the geological constituents of several rock samples are to be detected, steps 2 and 3 are repeated for each rock sample, and the machine learning algorithm only needs to be trained once. The steps are described in detail in the rest of the description below.

The method according to the invention can be implemented by a computing system, notably a computer, in particular for steps 1.3, 2 and 3 (3.1 and 3.2).

FIG. 1 schematically illustrates, by way of non-limitative example, the steps of the detection method according to an embodiment of the invention. The offline steps Off are first carried out from the training images IAP. Each training image IAP is segmented SEG into at least two colors: one color is associated with the areas without geological constituents, at least another color being associated with the areas comprising geological constituents. Each training image IAP and each segmented image is then partitioned DEC into multiple patches. The machine learning algorithm ALG is then trained by patch classification. Online Onl, a rock sample image IER is acquired. Rock sample image IER is partitioned DEC into multiple patches. By applying the model MOD resulting from machine learning algorithm ALG to the patches of the acquired rock sample image IER, the geological constituents cge of the rock sample are detected.

1—Training of the Machine Learning Algorithm

This step trains the machine learning algorithm to be able to automate the detection of geological constituents from the training images. At the end of this step, the machine learning algorithm forms a model having as an input a rock sample image, and as output the detection of geological constituents.

The method according to the invention requires few training images due to the segmentation and partitioning of the training images into patches, which steps are described hereafter. Thus, the time and the operations required for training the algorithm are reduced. Advantageously, the number of training images can range between 3 and 20, preferably between 3 and 10, and it can be 5. For example, it is clear that the acquisition of 5 microscope images of thin sections is 60 times faster than the acquisition of 300 microscope images of thin sections, which are useful for the methods according to the prior art using several hundred training images. If each acquisition of a microscope image of a thin section is estimated at around ten minutes, the gain in this case is 2950 min, i.e. more than 49 h. Thus, the method according to the invention is less tedious and faster.

In addition, the method according to the invention can comprise a preliminary step of training image acquisition, and this step can be carried out in the same manner as rock sample image acquisition step 2. For example, this preliminary step can prepare thin sections and perform microscopy of these thin sections to form the training images.

According to an embodiment of the invention, the machine learning algorithm can be a supervised machine learning classification algorithm, for example an artificial neural network, preferably a convolutional neural network (CNN) or a fully convolutional neural network (FCNN). The convolutional neural network and the fully convolutional neural network are particularly suitable for image processing.

Alternatively, the machine learning algorithm can be of any type, notably a non-convolutional neural network, a random forest method, a support vector machine method, or a Gaussian process method.

1.1—Segmenting the Training Images

This step segments the training images into at least two colors:
   a first color for the areas of the training images without geological constituent, and
   at least a second color for the areas of the training images with a geological constituent.

According to an embodiment of the invention, the training images can be segmented in two colors only: in this case, all the geological constituents have the same color. The detection method then allows to detect all the geological constituents. For this embodiment, the first color can be black and the second color can be white (or vice versa), the contrast is thus improved.

Alternatively, the training images can be segmented into colors greater in number than two. In this case, a color can be assigned by type of geological constituent. According to a first example, a color can be assigned for microfossils, and a color for plant debris, etc. According to a second example, a color can be assigned by different types of microfossils, or different types of plant debris, etc. Moreover, these examples can be combined: one color can be assigned by different types of microfossils, and one color by different types of plant debris, etc.

1.2—Partitioning the Training Images and the Segmented Images

This step partitions the training images and the segmented images obtained in the previous step into patches. A patch is understood to be a part of the training image or of the segmented image. Thus patches are comprised of a set of adjacent pixels of the training image or of the segmented image. Two sets of patches are thus obtained with a first set of patches of the training images and a second set of patches of the segmented images. Moreover, the method according to the invention does not directly train the machine learning algorithm to identify the geological constituents in whole images, but simply to work on small pieces of images (patches). To a certain extent, a complex task for which limited training data is available is replaced by a series of more simple tasks for which more data can be generated, which allows the number of training images to be reduced.

According to an embodiment of the invention, the patches can have a substantially rectangular or even square shape. However, the patches may have any other shape.

Preferably, the size of the patches can substantially correspond to the dimensions of the geological constituents. For example, the minimum size of the patches can substantially correspond to the size of a rectangle that encompasses the largest geological constituent.

According to an aspect of the invention, all the patches can have the same number of pixels to facilitate machine learning. Thus, it is not necessary to plan resizing the patches for machine learning. In a variant, the patches have different numbers of pixels.

In order to improve training of the machine learning algorithm and therefore the precision of the detection method according to the invention, the training images can be partitioned to form, for all of the training images, at least a hundred patches, preferably at least several hundred patches.

In this step, the initial training images and the segmented training images can preferably be partitioned identically. Thus, the training quality is improved. Indeed, it is desired to train the machine learning algorithm to reproduce the correspondence between the training image and the segmented image.

1.3—Classification

This step trains the supervised machine learning classification algorithm by use of partitioned patches of the training images and of the segmented images to classify the training image patches according to the color (or the colors, if applicable) of the corresponding segmented image patches. In other words, each area of the training images for which the corresponding segmented image patch is of the first color is defined as an area without geological constituent, and each area of the training images for which the corresponding segmented image patch is, at least partly, of the at least second color is defined as an area with a geological constituent.

Training of the machine learning algorithm can be performed notably by one of the following:

the method described in the document Ciresan, D., Giusti, A., Gambardella, L. M. & Schmidhuber, J. [2012]. Deep Neural Networks Segment Neuronal Membranes in Electron Microscopy Images. In Advances in Neural Information Processing Systems, 2843-2851. For this method, a neural network, if possible convolutional (CNN), is taught to classify patches by finding out whether their central pixel belongs to a desired constituent or not. This capacity is then applied pixel by pixel in the acquired image to delimit the desired constituents. In the rest of the description, this method is referred to as the "pixel-based" method, the method described in Ronneberger, O., Fischer, P., Brox, T. [2015] U-Net: Convolutional Networks for Biomedical Image Segmentation. In: Navab, N., Hornegger, J., Wells, W., Frangi, A. (eds) Medical Image Computing and Computer-Assisted Intervention— MICCAI 2015. Lecture notes in Computer Science, vol. 9351. Springer, Cham. For this method, a neural network, if possible fully convolutional (FCNN), is taught to segment the entire surface of the patches to delimit the desired constituents. This capacity is then applied in new images by partitioning them into patches of similar size and by working patch by patch. In the rest of the description, this method is referred to as the "patch-based" method.

Thus, for the embodiment using the pixel-based method, this step can be carried out by analysing the color of the central pixel of the patches of the segmented images. An artificial neural network is thus trained to automatically classify the unsegmented patches (of the training images) in at least two categories: either the central pixel is at least of the second color (it is not of the first color) in the segmented image (i.e. it belongs to one of the geological constituents to be identified), or the central pixel is of the first color in the segmented image (it does not belong to one of the geological constituents to be identified). Preferably, a deep machine learning method with a convolutional neural network (CNN) can be used. In general, the machine learning method can be alternatively selected from among the range of supervised classification methods operating on the images. FIG. 2 schematically illustrates, by way of non-limitative example, two patches of the same area. Patch 5 in the left-hand figure is the patch of the training image. This patch 5 comprises a geological constituent 6. Patch 7 in the right-hand figure is the patch of the segmented image, this patch 7 is of the second color (black here) due to the presence of geological constituent 6 in the corresponding area.

Thus, for the embodiment using the patch-based method, this step can be carried out by segmenting the entire surface of the patches so as to delimit the geological constituents. A machine learning algorithm is thus trained to automatically segment the unsegmented patches of the training images according to the categories defined above That is there are at least two first color (it does not belong to one of the geological constituents to be identified) or at least second color (it belongs to one of the geological constituents to be identified). Preferably, a deep learning method with a fully convolutional neural network (FCNN) can be used. FIG. 3 schematically illustrates, by way of non-limitative example, two patches of the same area. Patch 5 of the left-hand figure is the patch of the training image. This patch 5 comprises a geological constituent 6. Patch 7 of the right-hand figure is the patch of the segmented image, this patch 7 comprises an area 8 of the second color (black), which corresponds to geological constituent 6 of training patch 5. This patch 7 comprises an area 9 of the first color (white), which corresponds to an area without geological constituent of the training image.

2—Acquisition of the Rock Sample Image

This step acquires an image of the rock sample to be analysed. One of the image acquisition methods suited to the method according to the invention can be used: optical or electron microscope, photography, synchrotron radiation tomography scan, X-ray imaging, etc. Furthermore, an image can be directly acquired from the rock sample or from a thin section of the rock sample.

According to an embodiment of the invention, when the detection method of the invention uses thin section images, this step can comprise a sub-step of preparing a thin section from the rock sample to be analysed.

According to an aspect of the invention, a rock sample image larger than the area of the rock sample to be studied is acquired to avoid edge effects of the detection method.

3—Detecting the Geological Constituents of the Rock Sample

This step detects the geological constituents of the rock sample, by use of the acquired rock sample image and of the model formed by the machine learning algorithm. The model formed by the machine learning algorithm is thus applied to the acquired rock sample image.

3.1—Partitioning the Acquired Image

This step partitions the acquired rock sample image into patches in order to apply the model formed by the machine learning algorithm obtained in step 1 to each patch of the acquired rock sample image (obtained in step 2).

For the embodiment using the pixel-based method, this step can be carried out by partitioning the acquired rock sample image into patches by partitioning. That is for each pixel of the acquired image, a patch surrounds the pixel. According to an option of this embodiment, the acquired image patches can have substantially the same size as the training image and segmented image patches used for training the machine learning algorithm (step 1). This embodiment option allows better results to be obtained.

For the embodiment using the patch-based method, this step can be carried out by partitioning the acquired image into patches that cover the entire acquired image. According to an option of this embodiment, the acquired image patches can have substantially the same size as the training image and segmented image patches used for training the machine learning algorithm (step 1). This embodiment option allows better results to be obtained.

3.2—Detecting the Geological Constituents

This step detects the geological constituents of the rock sample by use of the model obtained by the machine learning algorithm (step 1) applied to the acquired image patches (step 3.1). At the end of this step, complete segmentation of the acquired image is obtained, with the colors used in step 1.1. The geological constituents of the acquired image are then detected at the pixels, whose color is the at least second color (in other words, which are not of the first color).

For the embodiment using the pixel-based method, this step can be carried out by identifying for each acquired image patch whether the central pixel belongs to a geological constituent or not, using the model formed by the machine learning algorithm. This pixel can then be colored with either the first color (if this pixel does not belong to a geological constituent) or with another color, the second color for example (if this pixel belongs to a geological constituent). At the end of this step, after applying this method to each pixel of the acquired image, color segmentation of the acquired image is obtained, with the areas of the at least second color corresponding to the geological constituents detected.

For the embodiment using the patch-based method, this step can be carried out by delimiting for each patch of the acquired image the geological constituents by using the model formed by the machine learning algorithm. In other words, for each acquired image patch, a geological constituent is delimited, if applicable, within the patch, and at least a second color is assigned to the possible geological constituent. At the end of this step, after applying this method to each patch of the acquired image, color segmentation of the acquired image is obtained, with the areas of the at least second color corresponding to the geological constituents detected.

FIG. 4 schematically illustrates, by way of non-limitative example, in the left part thereof, an acquired image 1 of a rock sample and, in the right part thereof, the segmented image 2 of image 1. This acquired image 1 was obtained by microscopy of a thin section of the rock sample. Segmented image 2 was obtained by use of the detection method according to the invention. For the detection method according to the invention, the machine learning algorithm has been trained with five training images. Furthermore, a convolutional neural network and the pixel-based method have been implemented. In segmented image 2, black corresponds to the first color, that is the areas without geological constituents, and white corresponds to the second color which is the areas with geological constituents 3. In this figure, the geological constituents that had not been identified by an operator when studying this thin section are illustrated by rectangles 4. Thus, it is noted that the method according to the invention can be more precise than an operator by automatically identifying all the geological constituents.

Furthermore, the method according to the invention can comprise at least one of the following additional steps:

counting the number of geological constituents of the acquired rock sample image from the detection of the geological constituent, in other words from the segmented acquired image, at least one of determining the proportion of the rock sample volume occupied by the geological constituents, from the detection of the geological constituent, in other words from the segmented acquired image, at least one of estimating morphological and textural characteristics (for example shape, dimensions, presence of scratches, etc.) of the geological constituents, using image processing for example, at least one of applying a supervised classification method to categorize the geological constituents from the detection of the geological constituent. For example, the species to which each detected microfossil belongs can be determined. This step may require preliminary training of an artificial neural network to perform this categorization, from a dedicated image base, independently of the learning algorithm of the detection method according to the invention.

These steps can be carried out automatically, preferably using computing such as by a computer.

Furthermore, the invention relates to a soil or subsoil exploitation method. For this method, the following steps are carried out:

a) detecting at least one geological constituent of a rock sample by use of the detection method according to any one of the above variants or variant combinations; and b) at least one of exploiting the soil and the subsoil according to the geological constituents of the rock sample detected in the previous step.

For this soil or subsoil exploitation method, the method can comprise a preliminary step of taking a rock sample from the soil or the subsoil.

Exploitation can notably concern the field of buildings or engineering structures construction, or the exploitation of raw materials, or the field of gas storage, of risk determination, etc.

In the field of construction, the composition of at least one rocky outcrops and of the subsoil is determined by categorization of the rock, and construction is achieved by adapting notably the foundations and the structure of the construction according to the rock categorization. For these applications, the sample of the rock to be categorized can be taken from the soil or the subsoil at a shallow depth.

In the field of raw material exploitation (for example for quarries, mines, hydrocarbon recovery, etc.), the composition of at least one of the rocky outcrops and of the subsoil is determined by detection of the geological constituents of the rock, and exploitation of the raw materials (which can be the rock itself, a material, for example a metal or a fluid, hydrocarbons for example, present in the subsoil) is achieved by allowing determination of the appropriate zones (i.e. drilling zones, zones to be dug for mines or quarries, etc., for raw material recovery), and to determine the methods and tools to be used (for example enhanced oil recovery, drilling tools, nature of the explosives for mines or quarries, etc.). For these applications, the sample of the rock to be categorized can be taken from deep in the subsoil, it can result from drill cuttings, or come from an outcrop, etc.

In the field of gas storage, $CO_2$ for example, the subsoil composition is determined by categorization of the rock, and the gas is stored in the subsoil in a suitable zone, that is an underground zone providing leak-free gas storage.

In the field of risk determination, the composition of a rocky outcrop (cliff) is determined by categorization of the rock, and a consolidation operation is performed if there is a risk of subsidence or collapse of the rocky outcrop.

This method thus enables at least one of soil and subsoil exploitation in a fast and simple manner, without calling on an expert geologist. The method also allows faster processing of very large amounts of rocks.

The invention also relates to a method of determining the climate in a geographical area through geologic ages, wherein the following steps are carried out:
a) taking at least two rock samples at different depths of an underground formation, and the rock samples can come from the same rock deposit succession;
b) detecting at least one geological constituent for each rock sample by the detection method according to any one of the above variants or variant embodiments; and
c) determining the climate and the geologic age in the geographical area according to the at least one geological constituent detected.

It is clear that the invention is not limited to the embodiments described above by way of example and that it encompasses any variant embodiment.

The invention claimed is:

1. A method of detecting at least one geological constituent of a rock sample from training images, comprising steps of:
a) segmenting the training images by digital processing into a segmented image of at least two colors with a first color of each area of the training images comprising no geological constituent, and with at least a second color of each area of the training images comprising a geological constituent;
b) partitioning the segmented training images of at least two colors and the segmented images into patches;
c) training a machine learning classification algorithm by using the patches of the segmented training images of the at least two colors and by using the patches of the segmented training images for classifying the patches of the training images according to colors of the patches of corresponding segmented training images;
d) acquiring an image of the rock sample;
e) partitioning the acquired image of the rock sample into the patches; and
f) detecting the at least one geological constituent in each of the patches of the acquired image of the rock sample by application of a model formed by the trained machine learning application of the classification algorithm to the patches of the acquired image of the rock sample.

2. A detection method as claimed in claim 1, wherein the geological constituent is selected from one of microfossils, nanofossils, plant debris, minerals, and pollen spores.

3. A detection method as claimed in claim 1, wherein each one of the at least second colors corresponds to a type of geological constituent.

4. A detection method as claimed in claim 1, wherein a number of training images ranges between 3 and 20.

5. A detection method in accordance with claim 4, wherein the number of training images ranges between 3 and 10.

6. A detection method as claimed in claim 1, wherein the machine learning algorithm uses an artificial neural network, selected from one of a convolutional neural network and a fully convolutional neural network.

7. A detection method as claimed in claim 1, wherein the image of the rock sample is acquired from a section of the rock sample.

8. A detection method as claimed in claim 1, wherein the image of the rock sample is acquired by use of an optical or electron microscope, using light, photography, synchrotron radiation tomography scanning or X-ray imaging.

9. A detection method as claimed in claim 1, wherein the machine learning classification algorithm is trained to classify the patches of the training images, by analyzing the color of a central pixel of the patches of the segmented images.

10. A detection method as claimed in claim 9, wherein the acquired image of the rock sample is partitioned into patches by partitioning a patch which surrounds each pixel, and the model formed by the trained machine learning classification algorithm determines whether the surrounded pixel belongs to the geological constituent.

11. A detection method as claimed in claim 1, wherein the machine learning classification algorithm is trained to segment an entire surface of the patches of the training images to delimit the geological constituent.

12. A detection method as claimed in claim 11, wherein the geological constituents are detected by delimiting each patch of the acquired image of the rock sample of the geological constituent.

13. A detection method as claimed in claim 1, wherein the detection method comprises at least one of:
counting a number of geological constituents of the acquired image of the rock sample from detection of the geological constituents;
determining from detection of the geological constituents a proportion of a rock sample volume occupied by geological constituents;
estimating at least one of morphological, textural characteristics of the geological constituents; and
applying a supervised classification method for categorizing the geological constituents from the detection of the geological constituent.

14. A method of exploiting a soil or a subsoil comprising:
a) detecting at least one geological constituent of a rock sample by using the method of claim 1; and
b) exploiting the soil or the subsoil according to the detection of the geological constituent of the rock sample.

15. A soil or subsoil exploitation method as claimed in claim 14, wherein the soil or subsoil exploitation comprises constructing a structure on the soil or in the subsoil, constructing gas storage in the subsoil, exploiting raw materials of the soil or the subsoil, and wherein raw materials contained in the soil or the subsoil is one of rock, a material or a fluid.

16. A method of determining climate in a geographical area through geologic ages, comprising:
a) taking at least two rock samples at different depths of an underground formation;
b) detecting at least one geological constituent for each rock sample by using the detection method of claim 1; and
c) determining the climate and geologic age in the geographical area according to the detected at least one geological constituent.

* * * * *